Patented Sept. 15, 1942

2,296,180

UNITED STATES PATENT OFFICE 2,296,180

CARBONATED CHOCOLATE BEVERAGE AND METHOD OF PREPARING THE SAME

Aaron D. Pashkow, Chicago, Ill.

No Drawing. Application October 28, 1939, Serial No. 301,731. In Canada June 30, 1938

7 Claims. (Cl. 99—79)

My invention relates to the preparation of bottled, carbonated chocolate beverages and is particularly concerned with the preparation of such beverages having the property of withstanding spoilage or deterioration over prolonged periods of time, in general, for approximately two years and in many instances for substantially longer periods of time under normal conditions of storage.

The preparation and commercial distribution for sale of bottled, carbonated chocolate beverages in the same general manner in which other carbonated beverages, such as the usual cherry, strawberry, lemon, lime, grape, cola and like carbonated beverages, have been distributed and sold has been attempted on numerous occasions in the past but has met with repeated failure. It has been found that carbonated chocolate beverages, which contain a cocoa fiber content due to the natural constituents of the cocoa bean which, when roasted and ground in known ways in the art, forms a part of the chocolate beverage, do not respond to the same kind of treatment which is utilized in connection with other carbonated beverages. Those skilled in the art have found that, unless the carbonated beverage, after being sealed in the conventional glass bottles or the like, is subjected to relatively drastic heat sterilizing treatment, namely, at temperatures of the order of 240 deg. F. for at least fifteen minutes, in other words, well above the boiling point of the beverage, it will deteriorate or spoil in a relatively short period of time.

The necessity for the utilization of such high temperatures in order to obtain a product which possessed adequately satisfactory keeping properties so that it could be shipped and distributed in accordance with normal conditions in commerce, however, introduced other factors which militated so much against the product and factors involving its preparation as seriously to discourage its production despite its wide taste appeal to the purchasing public. In the first place, the high temperatures utilized to insure adequate sterility of the beverage so that it would keep without spoiling for prolonged periods of time had an adverse effect upon taste and flavor of the finished beverage. More important than this, however, was the fact that, at the high sterilizing temperature found to be necessary, the gaseous pressure within the sealed bottle containing the carbonated chocolate beverage increased to such a substantial degree that a large percentage of the bottles burst. Apart from the economic wastage resulting from this condition, the hazard to human life of the bursting of the bottles, the blowing of crowns, and the like was sufficiently great so that the production of such beverages was greatly discouraged.

In an effort to meet this problem, various preservation procedures and techniques were attempted. Thus, for example, the use of sterilizing radiations such as ultra-violet rays and the like was suggested but failed to accomplish the desired results. Again, various chemical preservatives were tried such as ozone, hydrogen peroxide and the like but these likewise proved to be of no avail. The result was that many manufacturers of bottled carbonated beverages, after repeated efforts over a period of many years, finally gave up their efforts to market a bottled adequately carbonated chocolate beverage.

While carbonic dioxide or carbonic acid gas is, in general, itself considered as a preservative and is used largely for this purpose in various bottled non-alcoholic beverages, in bottled chocolate beverages it appears to exert relatively slight preservation action since experience has shown repeatedly that carbonated chocolate beverages, even when carbonated to a very considerable extent, undergo deterioration or spoilage after only a relatively short period of time. Carbonation of chocolate beverages is resorted to for the purpose of providing a product having a zest and sparkle and for enhancement of the taste characteristics of the beverages so that they will appeal to the consuming public. Any preservative action of the carbon dioxide present therein which may possibly take place is, at best, incidental and, under any circumstances, for practical purposes can be disregarded. Indeed, even when carbonation of the bottled chocolate beverages is accompanied by a heat sterilization at temperatures of the order of 180 degrees F. and even substantially higher, there is no material improvement in the keeping properties of the bottled beverage, experience having shown again and again that such products do not meet the rigid requirements necessary to provide a commercially satisfactory product.

After considerable investigation, I have made the surprising discoverey that bottled, carbonated chocolate beverages can be produced in a simple and efficacious manner which have exceptional keeping properties and the manufacture or preparation of which overcomes the various objections heretofore encountered in the art.

It is, accordingly, an important object of my invention to produce bottled, carbonated chocolate beverages which, under the usual conditions of distribution and storage, will keep for prolonged periods of time, upwardly of several months and as long as two years or more, without undergoing decomposition, deterioration or spoilage.

Another object of my invention comprises the preparation of bottled, carbonated chocolate beverages, having exceptional keeping properties, under such conditions that the danger and economic loss resulting from the bursting of bottles is effectually eliminated.

A still further object of my invention concerns the provision of a method of preparing bottled, carbonated chocolate beverages, having exceptional keeping properties, which includes a heat treatment at relatively low temperatures whereby the desired taste characteristics of the finished beverage are not impaired.

Other objects of my invention will become clear in the light of the detailed description of my invention as hereinafter set forth.

In general, my invention is predicated on the discovery that if the bottled, carbonated chocolate beverages are subjected to a heat treatment at relatively low temperatures, far below those necessary to bring about sterilization adequate to enable the product to keep for any materially appreciable length of time, nevertheless, if that heat treatment at said relatively low temperatures is carried out in the presence in the beverage of a small proportion of sodium benzoate, products result having extraordinary keeping properties. Indeed, even under adverse conditions of storage, the products have kept a minimum of two months, and in most instances the products have kept without deterioration or spoilage for over two years and, so far as I am aware, would keep more or less indefinitely under the usual conditions encountered in distribution and/or storage thereof prior to consumption by the consumer.

After much study, I have been unable definitely to account for or explain the startling results which I have obtained. It would appear that, at the temperatures used in the heat treatment, though they are relatively low, some interaction takes place between the sodium benzoate and one or more of the constituents of the carbonated chocolate beverage. In the presence of sodium benzoate coupled with the application of heat, the normally slight preservative action of carbon dioxide in the chocolate beverage appears to be catalyzed so that the inhibition of micro-organic life is increased and becomes effective at much lower temperatures than are otherwise required to bring about preservation. However, whatever the mechanism of the reaction may be, there appears to be no question but that the sodium benzoate and heat treatment act conjointly in the presence of the carbonated chocolate beverage to bring about the important and unusual results which I have described hereinabove.

In an illustrative embodiment of my invention, a conventional beverage mixture was prepared containing cocoa, a sugar and water, with or without stabilizers such as gums or hydrophilic colloids such as alginates, Irish moss, pectin, gelatin, gum tragacanth or the like to maintain the cocoa fibers in suspension in the beverage. One illustrative formula comprised approximately one gallon of a chocolate syrup, about eight pounds of cane sugar, and slightly over two gallons of water. The resulting mixture was carbonated to the desired extent, namely, utilizing somewhat over two volumes of carbonic acid gas per volume of beverage, sealed in the usual seven ounce glass bottles, and the sealed bottles of the carbonated chocolate beverage were subjected to a temperature of about 170 degrees F. to 175 degrees F. for thirty minutes and then cooled to about 45 degrees F. The chocolate syrup utilized in preparing the beverage contained approximately one pound of a cocoa having a relatively low cocoa butter content, about twenty-seven pounds of cane sugar, not quite two gallons of water, a small proportion of vanillin and salt as flavoring constituents, and a sufficient amount of sodium benzoate so that, when the chocolate syrup is mixed with the other ingredients as specified hereinabove, the sodium benzoate is present in the final beverage in an amount approximating 0.1%.

It will be appreciated that the example given hereinabove is purely illustrative and is not to be construed as limitative of my invention, the scope of which is pointed out in the appended claims. Thus, for example, the proportions of cocoa or chocolate and sugar may be varied within relatively wide limits depending upon the taste characteristics desired in the finished product. The same is true with respect to the degree of carbonation employed although, in this case, it will be appreciated that the pressure of the carbonic acid gas must not be so great that bursting of bottles will occur even at the relatively low temperatures utilized in the heat treatment. In general, the ratio of the volume of carbonic acid gas to the volume of the chocolate beverage may range from approximately 1½ to 1 to 3 to 1 with about 2½ to 1 representing a preferred embodiment.

The sodium benzoate is employed in small proportions in the carbonated chocolate beverage, generally of the order of 0.1%. Somewhat smaller or somewhat larger proportions may be employed but do not represent the preferred form of my invention. Thus, for example, proportions larger than 0.1%, while permitting the use of lower temperatures of heat treatment, tend to affect adversely the palatability of the beverage. On the other hand, lower percentages, such as 0.05%, require a slightly higher heat treatment temperature, namely, of the order of 190 degrees F. to about 200 degrees F. In general, the temperature of heat treatment varies inversely with the decrease in the amount of sodium benzoate employed.

The temperature of heat treatment, as indicated hereinabove, is subject to some variation, depending, among other things, on the specific formula of the chocolate beverage, the degree of carbonation utilized, and the amount of sodium benzoate. In general, temperatures of about 120 degrees F. to 180 degrees F., are quite satisfactory, 170 degrees F. to 180 degrees F. representing a particularly preferred range when using 0.1% sodium benzoate in a well carbonated chocolate beverage. While temperatures somewhat below 120 degrees F. or somewhat above 180 degrees F. may, in certain cases, be employed, they do not represent the recommended practice in carrying out my invention. The temperature during the heat treatment is preferably maintained for approximately thirty minutes but this is subject to relatively wide variation, being dependent, among other things, on the temperature of the heat treatment. In general, a range of fifteen to forty-five minutes will serve in most cases.

What I claim as new and desire to protect by Letters Patent of the United States is:

1. A method of preparing bottled, carbonated chocolate beverages having the property of withstanding deterioration over prolonged periods of time, which comprises providing a sealed bottle containing a carbonated chocolate beverage comprising cocoa fiber, a sugar, and water and from about 0.05% to about 0.1% sodium benzoate, and heating said beverage while disposed within said sealed bottle for at least several minutes at a temperature falling within the range of approximately 120 degrees F. and 190 degrees F.

2. A method of preparing bottled, carbonated chocolate beverages having the property of withstanding deterioration over prolonged periods of time, which comprises providing a sealed bottle containing a carbonated chocolate beverage comprising cocoa fiber, sucrose, and water and from about 0.05% to about 0.1% sodium benzoate, and heating said beverage while disposed within said sealed bottle for at least several minutes at a temperature within the range of about 120 degrees F. to below that of the boiling point of the beverage at atmospheric pressure.

3. A method of preparing bottled carbonated beverages having the property of withstanding deterioration over prolonged periods of time, which comprises providing a carbonated beverage containing cocoa fiber, a sugar, water and from about 0.05% to about 0.1% sodium benzoate, placing said carbonated chocolate beverage in a relatively small glass bottle, sealing said bottle, and heating the sealed bottle at a temperature between about 160 degrees F. and about 190 degrees F. for at least several minutes.

4. A method of preparing carbonated chocolate beverages having the property of withstanding deterioration over prolonged periods of time, which comprises providing a sealed container within which is disposed a carbonated chocolate beverage containing from about 0.05% to about 0.1% sodium benzoate, and heating said beverage while disposed within said container for at least several minutes at a temperature ranging from about 120 degrees F. to not more than about 200 degrees F.

5. A method of preparing bottled, carbonated chocolate beverages having the property of withstanding deterioration over prolonged periods of time, which comprises providing a sealed glass bottle containing said carbonated chocolate beverage together with approximately 0.1% sodium benzoate, and heating said bottled beverage between about 120 degrees F. and about 190 degrees F. for at least fifteen minutes.

6. A bottled, carbonated, chocolate beverage having the property of withstanding deterioration over prolonged periods of time, said beverage including cocoa fiber, a sugar, water and from about 0.05% to about 0.1% sodium benzoate, the prolonged keeping properties of said beverage resulting from heating said beverage for at least several minutes in the presence of the sodium benzoate at a temperature ranging between about 120 degrees F. and about 190 degrees F. and while sealed within the bottle.

7. A bottled, carbonated, chocolate beverage having the property of withstanding deterioration over prolonged periods of time, said beverage containing from about 0.05% to about 0.1% of sodium benzoate, the prolonged keeping properties of said beverage resulting from heating said beverage for at least several minutes in the presence of the sodium benzoate at a temperature not less than about 120 degrees F. nor more than about 200 degrees F. and while sealed within the bottle.

AARON D. PASHKOW.